(12) United States Patent
Sathyan

(10) Patent No.: US 7,209,269 B1
(45) Date of Patent: Apr. 24, 2007

(54) DISPLAYING HOLOGRAPHIC THREE DIMENSIONAL IMAGES

(75) Inventor: Jithesh Sathyan, Kollam (IN)

(73) Assignee: Infosys Technologies Ltd., Bangalore (IN)

( * ) Notice: Subject to any disclaimer, the term of this patent is extended or adjusted under 35 U.S.C. 154(b) by 0 days.

(21) Appl. No.: 11/453,427

(22) Filed: Jun. 14, 2006

(51) Int. Cl.
*G02B 5/32* (2006.01)

(52) U.S. Cl. .................... 359/19; 359/15; 359/29; 359/32

(58) Field of Classification Search .............. 359/15, 359/19, 29
See application file for complete search history.

(56) References Cited

U.S. PATENT DOCUMENTS

2002/0071144 A1* 6/2002 Baba et al. ............. 359/23
2004/0196524 A1* 10/2004 Hughes et al. .......... 359/244
2004/0263930 A1* 12/2004 Payne .................... 359/32
2006/0098260 A1* 5/2006 Newswanger et al. ..... 359/15

OTHER PUBLICATIONS

Youzhi Li et al., "Computer-generated holograms of three-dimensional realistic objects recorded without wave interference," Appl. Opt. vol. 40, No. 17, pp. 2864-2870 (Jun. 2001).

Sajan Ambadiyil et al., "Performance Analysis and Material Dependence of Micro Holographic Optical Elements as Couplers for Fiber Optic Communication," Proceedings of SPIE vol. #5623, 8 pages (Nov. 2004).

Michael L. Huebschman et al., "Dynamic holographic 3-D image projection," Optics Express, vol. 11, No. 5, pp. 437-445 (Mar. 2003).

* cited by examiner

*Primary Examiner*—Fayez G. Assaf
(74) *Attorney, Agent, or Firm*—Klarquist Sparkman, LLP

(57) ABSTRACT

Holographic three dimensional images of objects can be displayed via a device comprising micro holographic optical elements (MHOEs). A device for displaying holographic three dimensional images of objects can comprise a laser source, a spatial filter using a micro holographic optical element (MHOE) lens, a collimating MHOE lens, a spatial light modulator, and cylindrical MHOE lenses. A holographic three dimensional image of an object can be displayed using MHOEs by emitting a coherent light, filtering and expanding the light, aligning the expanded light, modulating the aligned expanded light, and focusing the modulated light.

20 Claims, 13 Drawing Sheets

DISPLAYING HOLOGRAPHIC THREE DIMENSIONAL IMAGES

FIELD

The field relates to displaying holograms. More particularly, the field relates to using micro holographic optical elements in a device for displaying holograms.

BACKGROUND

Various technologies have been used to try to display the appearance of a three dimensional (3D) object using a two dimensional (2D) display. For example, a 2D display, such as a typical LCD or CRT computer display, can simulate a three dimensional object (e.g., using perspective and other 3D computer graphics techniques). However, these simulated 3D images (using 2D displays) do not truly display depth (e.g., amplitude is displayed, but not phase).

While existing technology can be used to create holographic 3D images, such existing technology is often inappropriate for consumer-level applications. For example, a device for displaying holographic three dimensional images can be constructed using conventional optical elements, but such a device will be heavy and will have alignment and packaging issues. Other holographic technology, such as the conventional technique for 3D display using stereoscopic display systems, causes distortion in the scale of an image with changes in viewing distance. Furthermore, other methods using real-time holography, or by producing a different image for right and left eye, will use substantial communication bandwidth.

Therefore, there exists ample opportunity for improvement in technologies related to displaying holographic three dimensional images.

SUMMARY

A variety of technologies related to systems and methods for displaying holographic three dimensional images of objects can be applied. Such technologies can be used for a device (e.g., a computing device) for displaying a holographic three dimensional image of an object. For example, the device can comprise a laser source, a spatial filter using at least one micro holographic optical element (MHOE) lens, a collimating MHOE lens, a spatial light modulator, and a display lens assembly comprising cylindrical MHOE lenses. The device can also comprise a processor module. The device can display the holographic three dimensional image of the object (e.g., a physical object or a text object) by filtering and expanding the light emitted by the laser using the spatial filter, aligning the light using the collimating MHOE lens, modulating the aligned light using the spatial light modulator (e.g., modulating the light based on a computer generated hologram representing the three dimensional image of the object), and focusing the modulated light using the cylindrical MHOE lenses (e.g., a horizontal and a vertical cylindrical MHOE lens).

A computer generated hologram can be created from an object using one or more Fourier transforms. Once created, a computer generated hologram can be sent, received, and displayed (e.g., by a device, such as a computing device, using MHOEs).

A holographic three dimensional image of an object can be displayed via a device comprising micro holographic optical elements. For example, the holographic three dimensional image can be displayed by emitting a coherent light, filtering and expanding the light using at least one MHOE lens, aligning the light using a MHOE lens, modulating the light, and focusing the light using cylindrical MHOE lenses. The modulation can be performed by a spatial light modulator. A computer generated hologram representing the holographic three dimensional image of the object can be used to display the hologram (e.g., by processing the computer generated hologram and providing a result of the processing to the spatial light modulator).

A device, comprising MHOEs, can be provided for displaying a holographic three dimensional image of an object. For example, providing the device can comprise providing a laser source, a spatial filter (comprising at least one MHOE lens), a collimating MHOE lens, a spatial light modulator, and cylindrical MHOE lenses. In addition, a processor module can be provided (e.g., for processing a computer generated hologram and controlling the spatial light modulator).

The foregoing and other objects and advantages of the invention will be appreciated more fully from the following further description thereof, with reference to the accompanying drawings.

DETAILED DESCRIPTION

Figure 1:
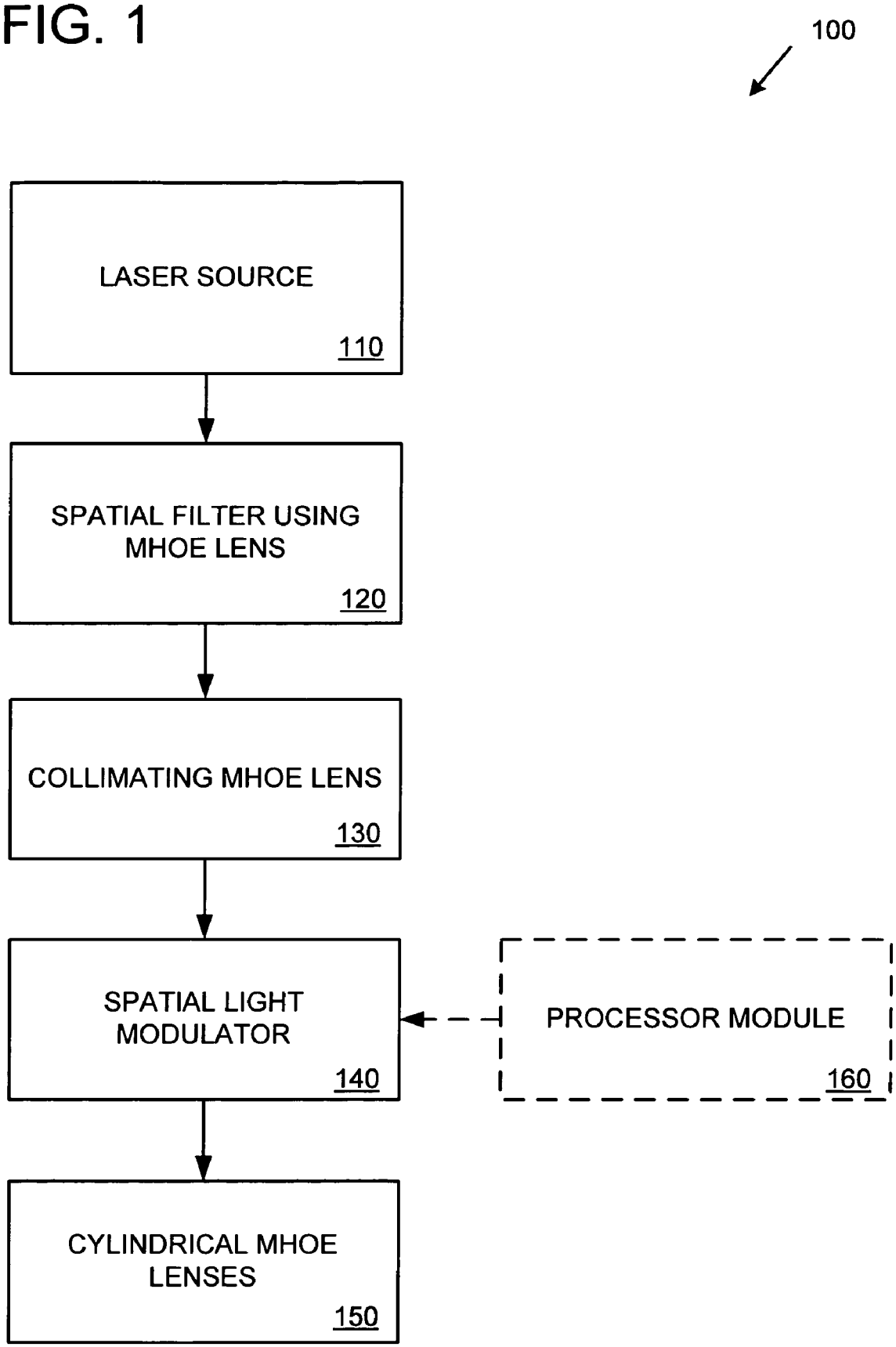
FIG. 1 is a diagram showing an exemplary system, comprising micro holographic optical elements, for displaying a holographic three dimensional image of an object.

The following description is a full and informative description of the best method and system presently contemplated for carrying out the invention which is known to the inventor at the time of filing the patent application. Of course, many modifications and adaptations will be apparent to those skilled in the relevant arts in view of the following description in view of the accompanying drawings and the appended claims. While the technologies described herein are provided with a certain degree of specificity, they may be implemented with either greater or lesser specificity, depending on the needs of the user. Further, some of the features described herein may be used to advantage without the corresponding use of other features described in the following paragraphs. As such, the present description should be considered as merely illustrative of the principles of the technologies and not in limitation thereof.

The invention relates to technologies for displaying holograms using micro holographic optical elements. To best understand the technologies described herein it is important to be familiar with the environment in which it is used and the basic terminologies.

Holography is a method of producing a three dimensional image of an object (e.g., by recording it on a film). The difference between a holographic three dimensional image and a two dimensional image is that a two dimensional image contains only amplitude information, while a holographic three dimensional image contains both amplitude and phase information.

A holographic optical element (HOE) is an optical component that can be used as a lens, mirror, collimator, grating, or other optical components. A micro holographic optical element (MHOE) can either be an HOE, recorded with two narrow beams of laser light, or a segment cut from a larger HOE and recorded in the conventional manner. MHOEs have multiple function capability and wavelength selectivity. Other advantages of MHOEs are design flexibility and ease of replication. Since the basic technology involves wavefront reconstruction through diffraction, it is easy to design and incorporate transfer functions of multiple elements such as lenses, mirrors, gratings, etc. in a single MHOE. Wavefront corrections and achievement of desired splitting/coupling ratios are other advantages. For example, MHOEs of size 0.8 mm, focal length 1 cm and 2 cm, and offset focusing angles of 30 degrees and 45 degrees can be recorded in PFG-01 and PFG-03M plates (e.g., using a 10 mW He—Ne laser of wavelength 632.8 nm). MHOEs of focal length 1 cm and 2 cm and offset focusing angles of 30 degrees and 45 degrees can also be recorded in PFG-04 plates (e.g., using a 120 mW He—Cd laser of wavelength 442 nm). MHOEs of other focal lengths can also be recorded (e.g., 1.5 cm or 3.2 cm). For example, MHOEs are described in "Performance Analysis and Material Dependence of Micro Holographic Optical Elements as Couplers for Fiber Optic Communication," by Sajan Ambadiyil et al., published in Proceedings of SPIE Vol. #5623 (November 2004).

While the preceding discussions relate to the fundamentals of the various terminologies related to this invention, the following sections provide the details of the various implementations.

The various technologies described herein may be incorporated into a device (e.g., a computing device) for displaying holographic 3D images of objects. For example, such a device can be used to display a digital holographic representation of an object (e.g., a computer generated hologram or another type of digital hologram). Such a device can be implemented using micro holographic optical elements (MHOEs), which can be used to implement lenses (micro holographic optical element lens), filters (micro holographic optical element filters), mirrors, gratings, and other types of optical -elements.

The difference between 2D and 3D images is that with 2D images one will find only amplitude variation recorded. But, with 3D images, both amplitude and phase are recorded. It is easy to send 2D information by reading information in each pixel, but in order to send, receive, and display 3D information the phase information needs to be sent along with amplitude information. Computer generated holography (e.g., using computer generated holograms) can be used to convert 3D information to 2D for sending and receiving using existing communication networks. A device (e.g., a computing device) incorporating micro holographic optical elements (MHOEs) can be used for displaying a holographic three dimensional image of an object (e.g., received by the device in the form of a computer generated hologram via a communication network).

Sending, receiving, and displaying holograms using existing communication networks is made possible because the data volume of computer generated holograms is much less than the information obtained when it is displayed. Therefore, it is possible to send and receive computer generated holograms over current communication networks where it would be impractical or impossible (e.g., due to bandwidth limitations) to send an unprocessed full holographic image. For example, computer generated holograms can be used to "compress" the full three dimensional information otherwise required to represent an object so that a three dimensional image of the object can be more easily transmitted and displayed due to decreased bandwidth requirements.

In certain implementations, cylindrical micro holographic optical element lenses are used, which are adapted to focus and clarify a displayed holographic three dimensional image of an object. In other implementations, micro holographic optical element lenses may be further adapted to expand, converge, and collimate the laser source at different stages prior to illuminating a spatial light modulator.

The technologies described herein can be used to display holographic three dimensional images of various types of objects. An object can be a text object (e.g., letters, numbers, symbols, punctuation, and the like). For example, a text object can be a text message entered into a wireless device, such as a cell phone (e.g., entered by a user of the wireless device). An object can be a physical object in the real-world (e.g., a car, a book, a tree, or any other type of physical object). For example, multiple images or pictures of a physical object (such as a car) can be captured (e.g., using a digital camera). A computer generated hologram representing the physical object can then be created using the captured images. An object can be an animation. For example, multiple computer generated holograms of a physical object can be created (e.g., as multiple frames) and displayed in succession as an animation. An object can also be a virtual object (e.g., a computer generated object such as 3D computer rendered object).

Computer generated holograms can be created representing three dimensional images of the various types of objects. For example, a computer generated hologram can be created via one or more Fourier transforms from a text object or a physical object (e.g., using the methods described in FIGS. 8 and 9). A holographic three dimensional image of the object can be displayed using the computer generated hologram. It should also be noted that computer generated holograms representing three dimensional images of objects can be created, sent, received, and displayed. In general, various types of digital holograms, including computer generated holograms, can be created, sent, received, and displayed using the technology described herein.

FIG. 1 shows an exemplary system 100, comprising micro holographic optical elements, for displaying a holographic three dimensional image of an object. In the example, a laser source 110 can be configured to emit a coherent light. Noise in the coherent light emitted by the laser source 110 can be filtered and expanded using a spatial filter 120. The spatial filter 120 uses one or more micro holographic optical element lenses (e.g., a micro holographic optical element lens can be used as an objective lens in the spatial filter). A collimating micro holographic optical element lens 130 can align the expanded light from the spatial filter 120.

A spatial light modulator (SLM) 140 can be configured to modulate the aligned and expanded light from the collimating lens 130. For example, the SLM 140 can modulate the aligned and expanded light according to a digital representation of the holographic three dimensional image of the object (e.g., a digital hologram). The SLM 140 can modulate the aligned and expanded light according to a computer generated hologram. For example, processing can be performed on the computer generated hologram and a result of the processing can be provided to the SLM 140. The modulated light from the spatial light modulator 140 can then be focused and clarified using cylindrical micro holographic optical element lenses 150. For example, a horizontal cylindrical micro holographic optical element lens and a vertical cylindrical micro holographic optical element lens can be used.

Optionally, as part of the system 100, a processor module 160 can obtain and process a digital representation of the holographic three dimensional image of the object (e.g., a computer generated hologram). For example, the processor module 160 can receive the computer generated hologram from an outside source (e.g., from a different device). The processor module 160 can obtain the computer generated hologram from a local source (e.g., from a memory storage device located at the same device as the processor module). The processor module 160 can also create the computer generated hologram (e.g., create the computer generated hologram of a text object entered by a user of the device).

Once the processor module 160 has obtained the computer generated hologram, the processor module 160 can process the computer generated hologram and provide a result of the processing to the spatial light modulator 140. The spatial light modulator 140 can modulate the aligned and expanded light based on the result of the processing. The modulated light from the spatial light modulator 140 can then be focused by the cylindrical micro holographic element lenses 150, thus displaying the holographic three dimensional image of the object.

Figure 12:
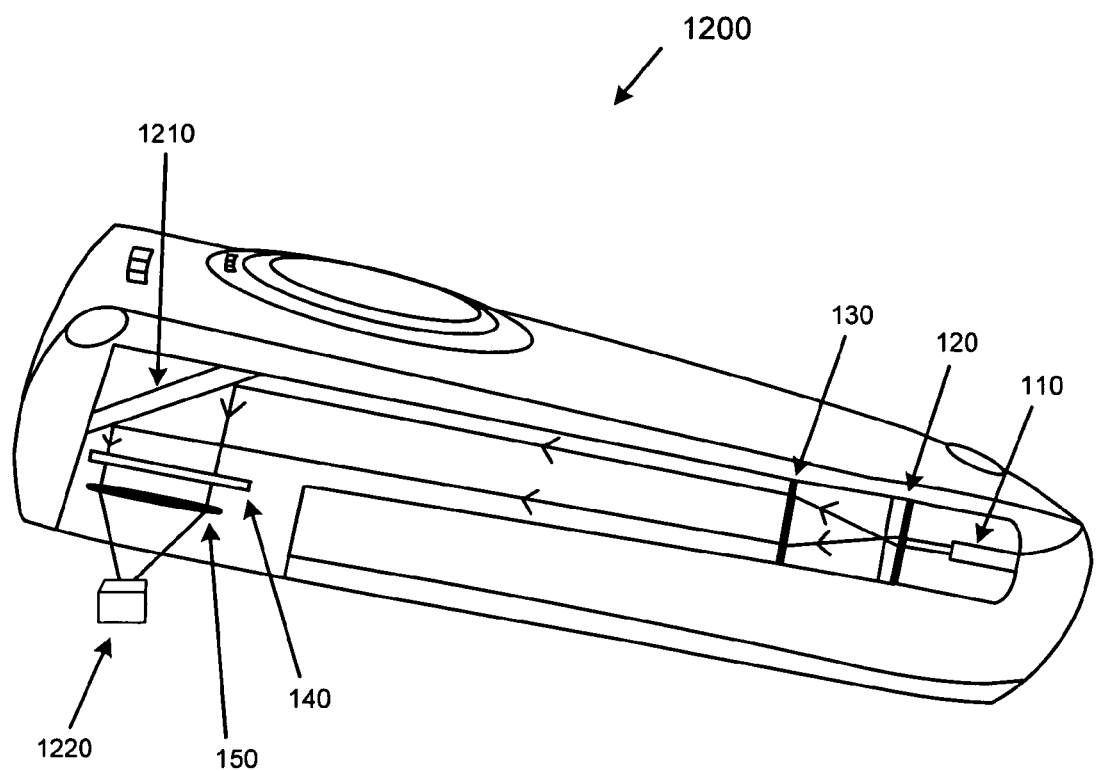
FIG. 12 is a perspective view of an exemplary device configured to display a holographic three dimensional image of an object.

The system 100 can be incorporated into, or be a part of, a device. For example, the device can be a holographic display device configured to display digital representations of holographic three dimensional images of objects. The device can also be a computing device, such as a computer (e.g., a desktop, laptop, or tablet computer), a cell phone, a PDA, or any other type of computing device. The device can be a communication device in a communication network (e.g., a computer connected to the Internet or a cell phone connected to a cellular communication network). For example, the communication device can be a device that supports voice, data, and/or multimedia communication. An example depicting the system 100 incorporated in a wireless computing device (e.g., a cell phone) is shown in FIG. 12.

The various components of the system 100 can be arranged and combined in various ways. For example, a single MHOE lens can be used to accomplish multiple functions (e.g., a single MHOE lens can be used for both the spatial filter 120 and the collimating lens 130). Different or additional components can also be incorporated into the system 100. For example, various lenses, mirrors, filters, and other components (e.g., MHOE components or non-MHOE components) can be incorporated into the system 100.

Figure 2:
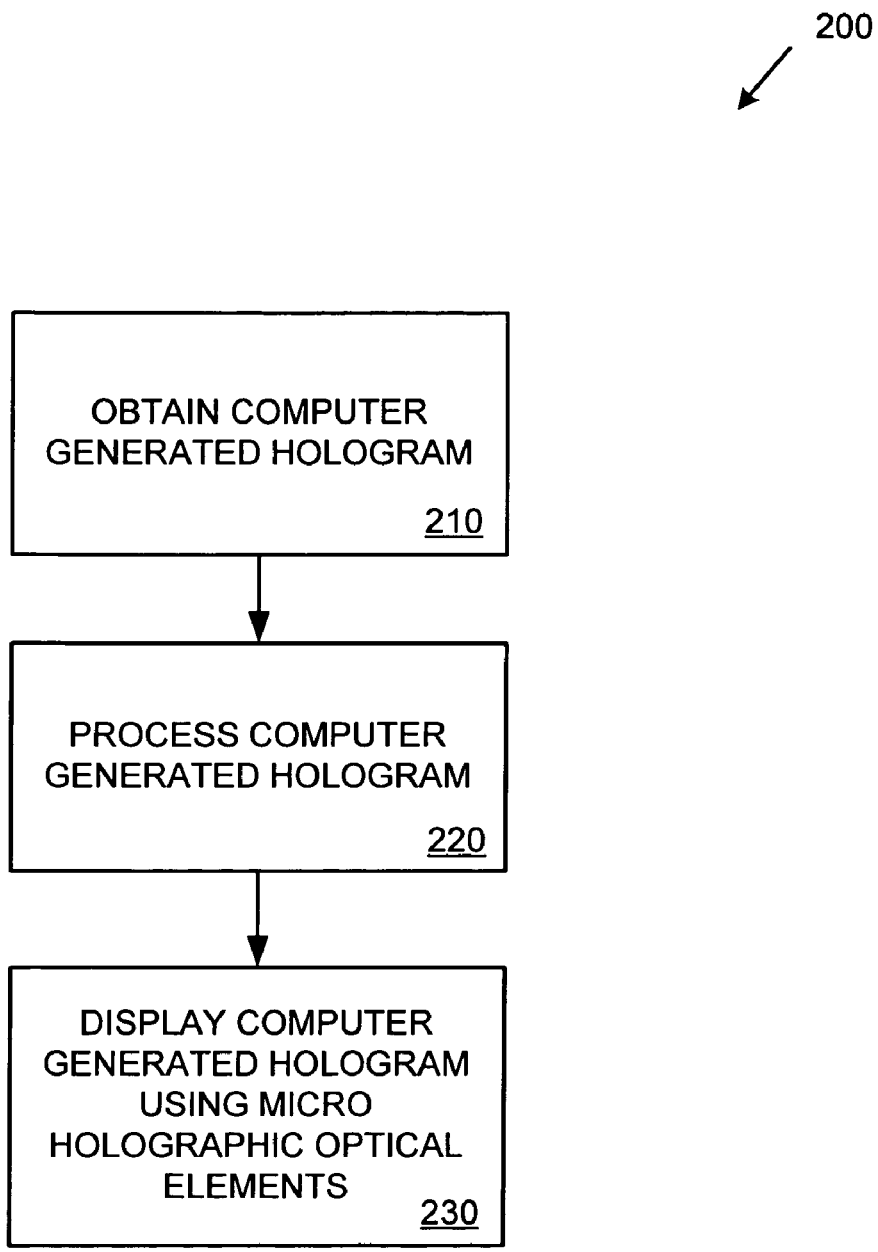
FIG. 2 is a flowchart showing an exemplary method for obtaining and displaying a computer generated hologram.

FIG. 2 shows an exemplary method 200 for obtaining and displaying digital representations of holographic three dimensional images, such as computer generated holograms, and can be performed, for example, by a system such as that shown in FIG. 1. The method 200 can be performed by a device (e.g., a computing device) comprising the system shown in FIG. 1. The computer generated holograms can represent holographic three dimensional images of objects, such as text objects (e.g., text messages) and physical objects (e.g., real-world objects such as a car or a building).

At 210, a computer generated hologram is obtained. For example, the computer generated hologram can be obtained from a communication network (e.g., obtained from a remote source over the Internet, or obtained from a wireless device over a wireless communication network). The computer generated hologram can also be obtained or generated locally (e.g., retrieved from a local memory storage device, or generated from a text object or a physical object using Fourier transforms).

At 220, the computer generated hologram is processed. The computer generated hologram can be processed by a processing module (e.g., the processing module 160). The processing of the computer generated hologram can prepare the computer generated hologram as an appropriate input for a spatial light modulator (e.g., the spatial light modulator 140).

At 230, the computer generated hologram is displayed using micro holographic optical elements. For example, the micro holographic optical elements can be used as spatial filters, collimating lenses, cylindrical lenses, and other types of optical elements. The computer generated hologram is displayed by displaying a holographic three dimensional image of the object represented by the computer generated hologram.

Figure 3:
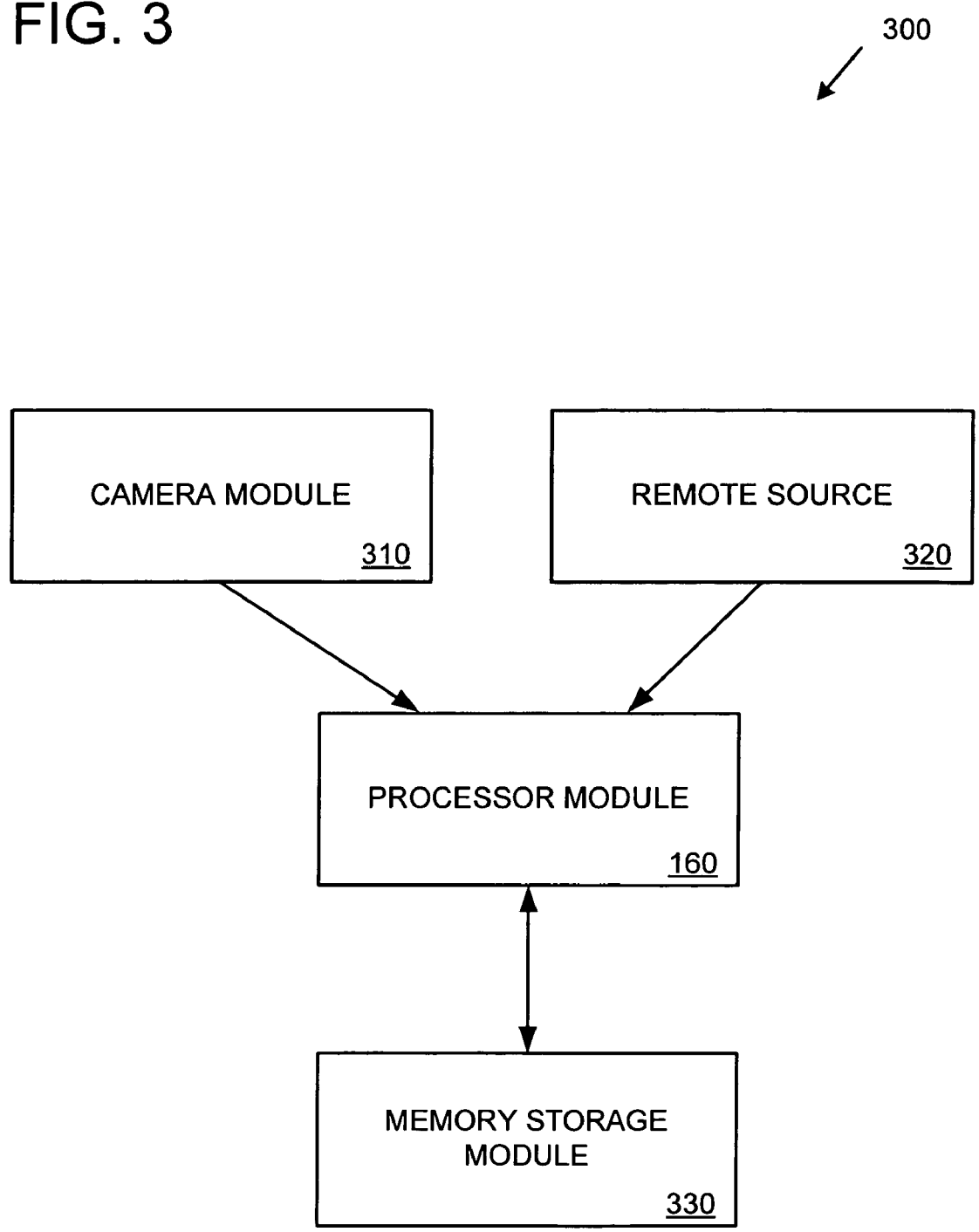
FIG. 3 is a diagram showing an exemplary system for obtaining and creating computer generated holograms.

FIG. 3 shows an exemplary system 300 for obtaining and creating computer generated holograms. In the example, a processor module 160 can obtain a computer generated hologram from multiple sources. For example, the processor module 160 can obtain the computer generated hologram from a remote source 320 (e.g., a remote Internet source, a remote wireless device, or a remote computing device). The processor module 160 can also obtain the computer generated hologram from a local source, such as a memory storage module 330 (e.g., computer storage such as flash memory, hard drive, or another type of computer storage).

The processor module 160 can generate the computer generated hologram. For example, a camera module 310 can capture a number of pictures (e.g., digital pictures) of a physical real-world object (e.g., take a number of pictures at different angles) and provide those pictures to the processor module 160. The processor module 160 can create the computer generated hologram using Fourier transforms (e.g., by using the method described in FIG. 8). The processor module 160 can also generate the computer generated hologram from a text object (e.g., a text message, such as a text message entered by a user of a cell phone). The processor module 160 can generate the computer generated hologram from the text object using, for example, the method described in FIG. 9.

The system 300 can be incorporated into a device for displaying computer generated holograms using micro holographic optical elements. For example, the camera module 310 can be incorporated into a computing device such as a laptop computer or wireless device and used to capture pictures of a physical object from which the computer generated hologram is created by the processor module 160 and then displayed by the computing device (e.g., displayed by a system such as that described in FIG. 1).

Figure 4:
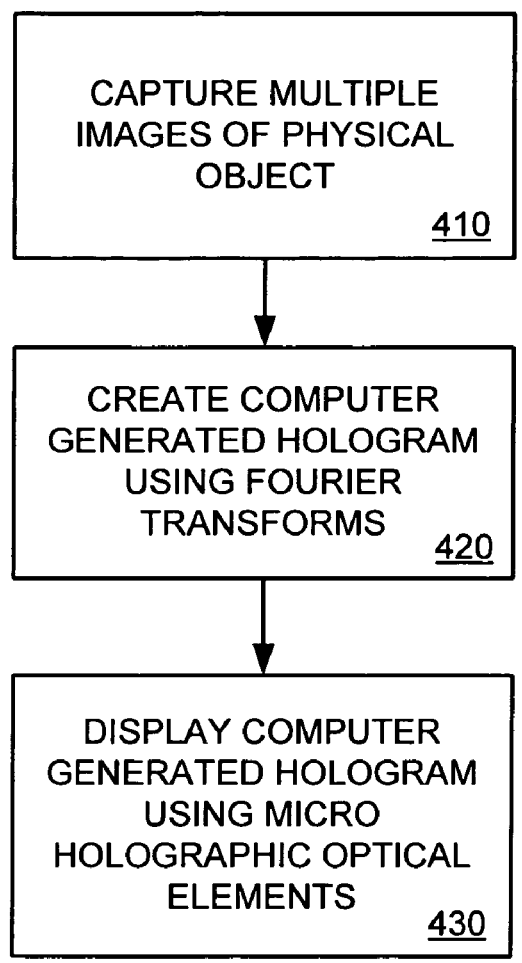
FIG. 4 is a flowchart showing an exemplary method for creating and displaying a computer generated hologram from a physical object.

FIG. 4 shows an exemplary method 400 for creating and displaying a computer generated hologram from a physical object (e.g., a real-world object such as a car or a building), and can be performed, for example, by a system such as that shown in FIG. 1. The method 400 can be performed by a device comprising the system shown in FIG. 1. At 410, multiple pictures of the physical object are captured at different angles (e.g., captured by a camera module as digital pictures). At 420, a computer generated hologram is created using Fourier transforms. For example, the method described in FIG. 8 can be used to create the computer generated hologram. At 430, the computer generated hologram is displayed using micro holographic optical elements. For example, a device such as that depicted in FIG. 12, comprising micro holographic optical elements, can be used to display the computer generated hologram by displaying a holographic three dimensional image of the physical object.

Figure 5:
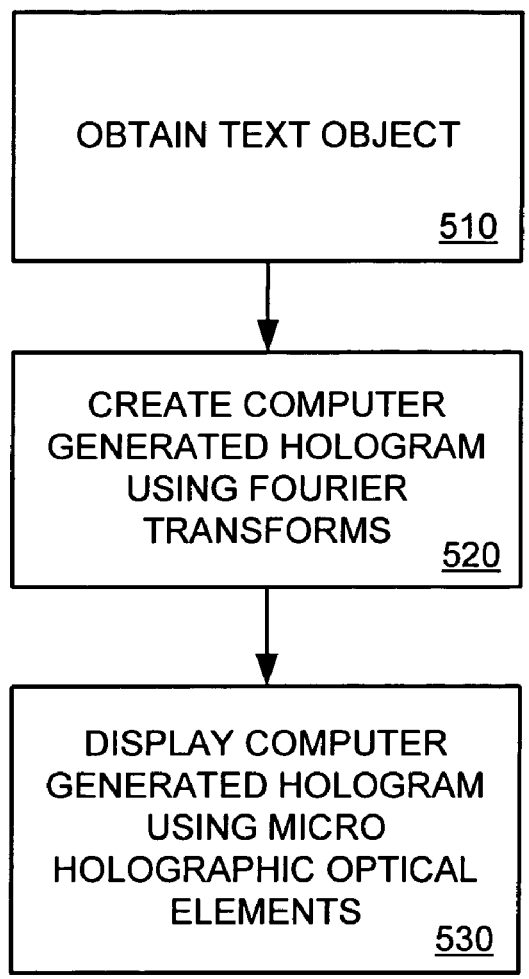
FIG. 5 is a flowchart showing an exemplary method for creating and displaying a computer generated hologram from a text object.

FIG. 5 shows an exemplary method 500 for creating and displaying a computer generated hologram from a text object (e.g., a text message comprising letters, numbers, symbols, or the like), and can be performed, for example, by a system such as that shown in FIG. 1. The method 500 can be performed by a device comprising the system shown in FIG. 1. At 510, a text object is obtained. For example, the text object can be obtained from a remote source (e.g., received from a remote wireless device). The text object can also be obtained locally (e.g., from a user of a device). At 520, a computer generated hologram is created using Fourier transforms. For example, the method described in FIG. 9 can be used to create the computer generated hologram. At 530, the computer generated hologram is displayed using micro holographic optical elements. For example, a device such as that depicted in FIG. 12, comprising micro holographic optical elements, can be used to display the computer generated hologram by displaying a holographic three dimensional image of the text object.

Figure 6:
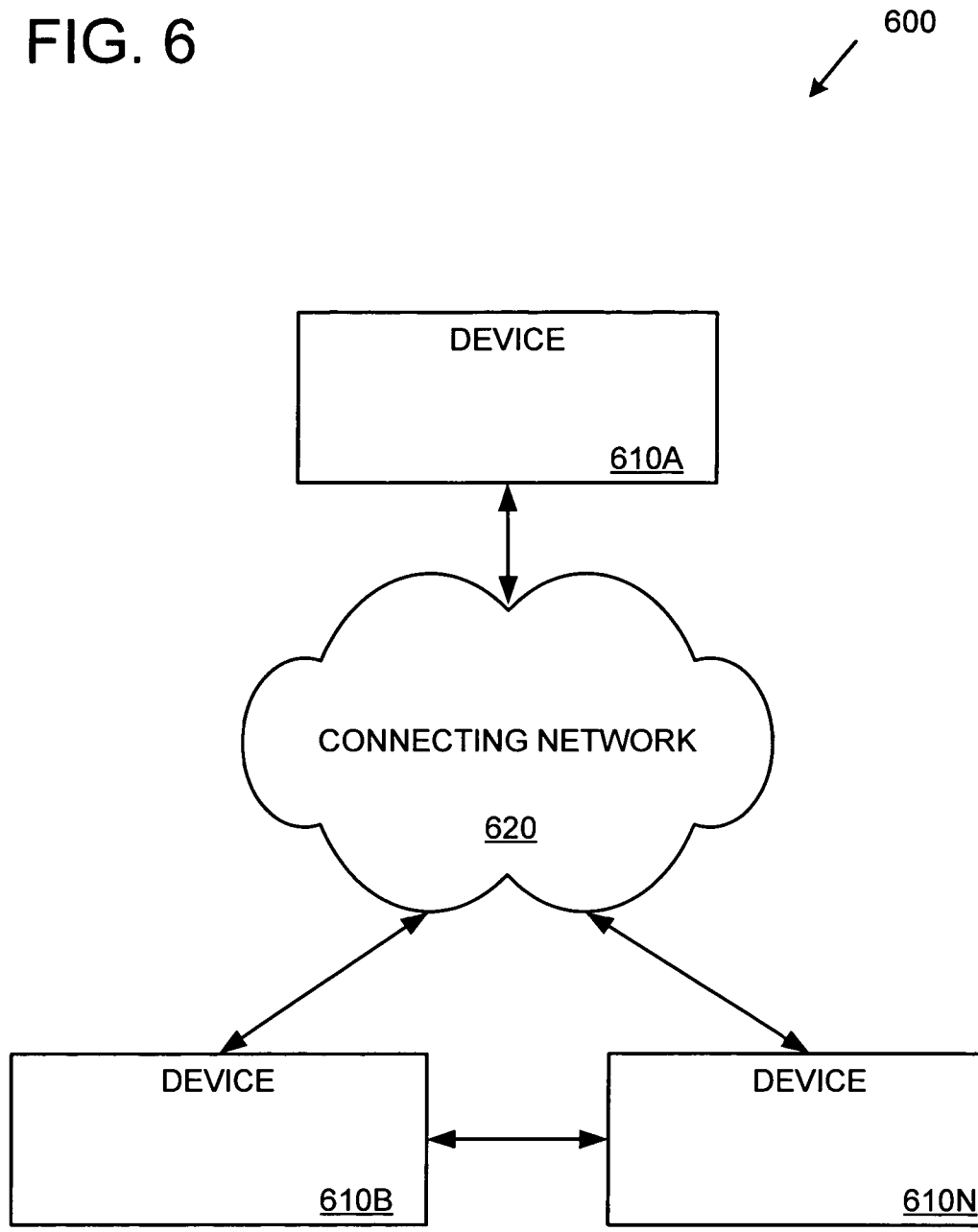
FIG. 6 is a diagram showing an exemplary network for sending, receiving, and displaying computer generated holograms.

FIG. 6 shows an exemplary network 600 for sending, receiving, and displaying computer generated holograms (e.g., using devices comprising micro holographic optical elements). In the network 600, any number of devices (e.g., devices 610A–610N) can communicate with one another. For example, the devices (e.g., 610A–610N) can be computing devices. The devices can communicate directly (e.g., device 610B can communicate directly with device 610N using, for example, a communication network such as an ad-hoc wireless network or a physical network connection). The devices can also communicate via a communication network such as connecting network 620. For example, the connecting network 620 can be a public network (e.g., the Internet), a private network (e.g., a local-area network of a business or organization), or any other type of communication network (e.g., various types of ad-hoc networks, fixed networks, LANs, WANs, or combinations of such networks).

One or more of the devices (e.g., 610A, 610B, or 610N) can be used to display computer generated holograms (to display holographic three dimensional images of objects represented by the computer generated holograms). One or more of the devices (e.g., 610A, 610B, or 610N) can comprise micro holographic optical elements. For example, a system such as that described in FIG. 1 can be used by one or more of the devices to display computer generated holograms. One or more of the devices (e.g., 610A, 610B, or 610N) can be used for creating, sending, and/or receiving computer generated holograms. For example, one of the devices (e.g., 610A) can be used to create a computer generated hologram from a text object (e.g., a text message entered by a user of the device 610A). The device 610A can then send the computer generated hologram to another device (e.g., 610B) via the connecting network 620. The receiving device 610B can then display the received computer generated hologram (display a holographic three dimensional image of the text object entered by the user of the device 610A).

Figure 7:
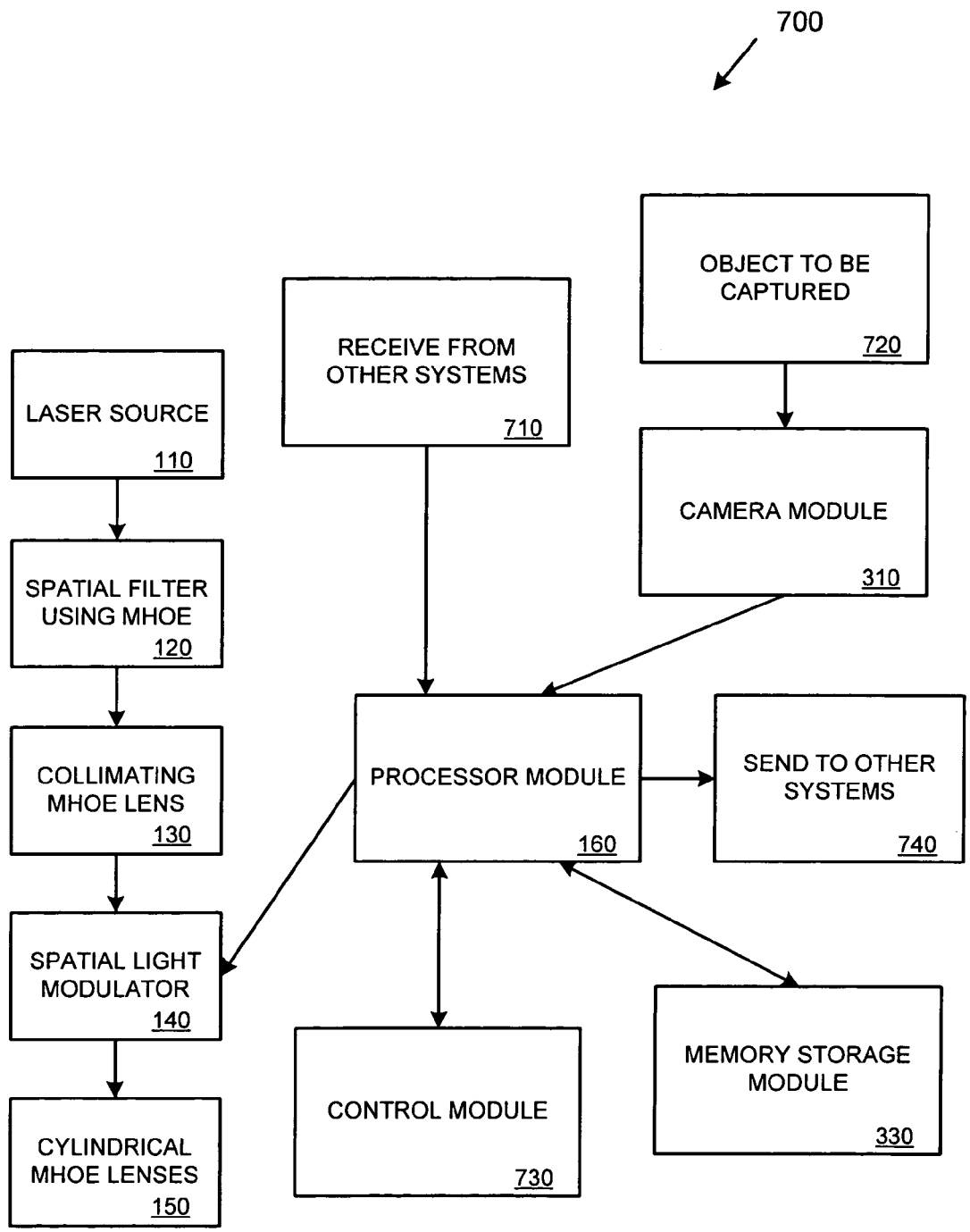
FIG. 7 is a block diagram illustrating various components configured to create, send, receive, and display holographic three dimensional images of objects.

FIG. 7 is a block diagram 700 illustrating various components configured to send, receive, create, and display holographic three dimensional (3D) images of objects (e.g., computer generated holograms representing the holographic 3D images of objects). The device 700 can be a computing device (e.g., a laptop, desktop, PDA, cell phone, wireless device, or the like). The device 700 includes a laser source 110 adapted to emit a coherent light. The device 700 further includes a spatial filter 120 adapted to filter out noise from the coherent light and generate an expanded light using at least one micro holographic optical element lens. The output of a laser source 110 is nearly Gaussian and needs to be filtered to remove optical noise components. This removal of noise needs to be done in order to get a good reference beam which can display holographic 3D images of objects with good quality. The filtering is achieved by the spatial filter 120.

The device 700 further includes a collimating micro holographic optical element lens 130 adapted to align the expanded light and a spatial light modulator 140 configured to modulate the aligned expanded light: For example, the SLM 140 can modulate the aligned expanded light according to a computer generated hologram. In one embodiment, the SLM 140 can be configured to receive a processed computer generated hologram (which was created, for example, by a complex Fourier transform of the three dimensional object) and display a holographic three dimensional image of the object (e.g., using cylindrical micro holographic optical element lenses 150 to focus and clarify the image).

In another embodiment, the spatial light modulator 140 may be further adapted to display a holographic three dimensional image from a complex Fourier transform of a three dimensional object received or created by the device. The spatial light modulator 140 here will be illuminated with the laser light and take the complex Fourier transform of the 3D object as input. The spatial light modulator 140 then draws the complex Fourier transform on its surface. The laser beam that falls on the spatial light modulator 140 will be modulated due to diffraction based on the complex Fourier transform drawn on it. Thus the 3D information which is the complex Fourier transform will display a 3D image of the object.

Furthermore, the device 700 includes a processor module 160 that can create a computer generated hologram using one or more Fourier transforms. The processor module 160 can receive computer generated holograms from other systems 710 (e.g., from another device, such as a wireless device). The processor module 160 can send computer generated holograms to other systems 740 (e.g., to another device, such as a remote device via the Internet, or to a wireless device via a wireless communication network). The processor module 160 can also prepare computer generated holograms for display. For example, the processor module 160 can process a computer generated hologram (e.g., a received or created computer generated hologram), and provide a result of the processing to the spatial light modulator 140.

Sending and receiving computer generated holograms (e.g., to other systems 740 or from other systems 710) can be accomplished using communication networks where available bandwidth is limited because only a plot of the complex transform is transmitted.

The device 700 can further include a control module 730 (e.g., a keypad and display). The control module 730 can comprise multiple activation keys configured for activating multiple functions of the device 700. For example, the control module 730 can be used for controlling the camera module 310 (e.g., for controlling the capturing of multiple pictures of a physical object), for initiating the sending and receiving of computer generated holograms (e.g., to and/or from other systems 710 and 740), for initiating the creation of computer generated holograms (e.g., from text objects such as text messages entered via the control module 730), for initiating the display of computer generated holograms, for communicating with the memory storage module 330, and for performing other functions related to the device 700.

The device 700 can also include a camera module 310 and a memory storage module 330. The camera module 310 may be adapted to capture the pictures or images of a physical object as a plurality of two dimensional pictures or images taken at different angles (referred to as "objects to be captured" 720). The memory storage module 330 may be adapted to store the pictures or images of the object, which are captured by the camera module 310. The camera module 310 may be any digital camera that is capable of capturing multiple pictures or images of an object at different angles. The number of images captured can directly affect the clarity of a resulting displayed hologram of the object.

Figure 8:
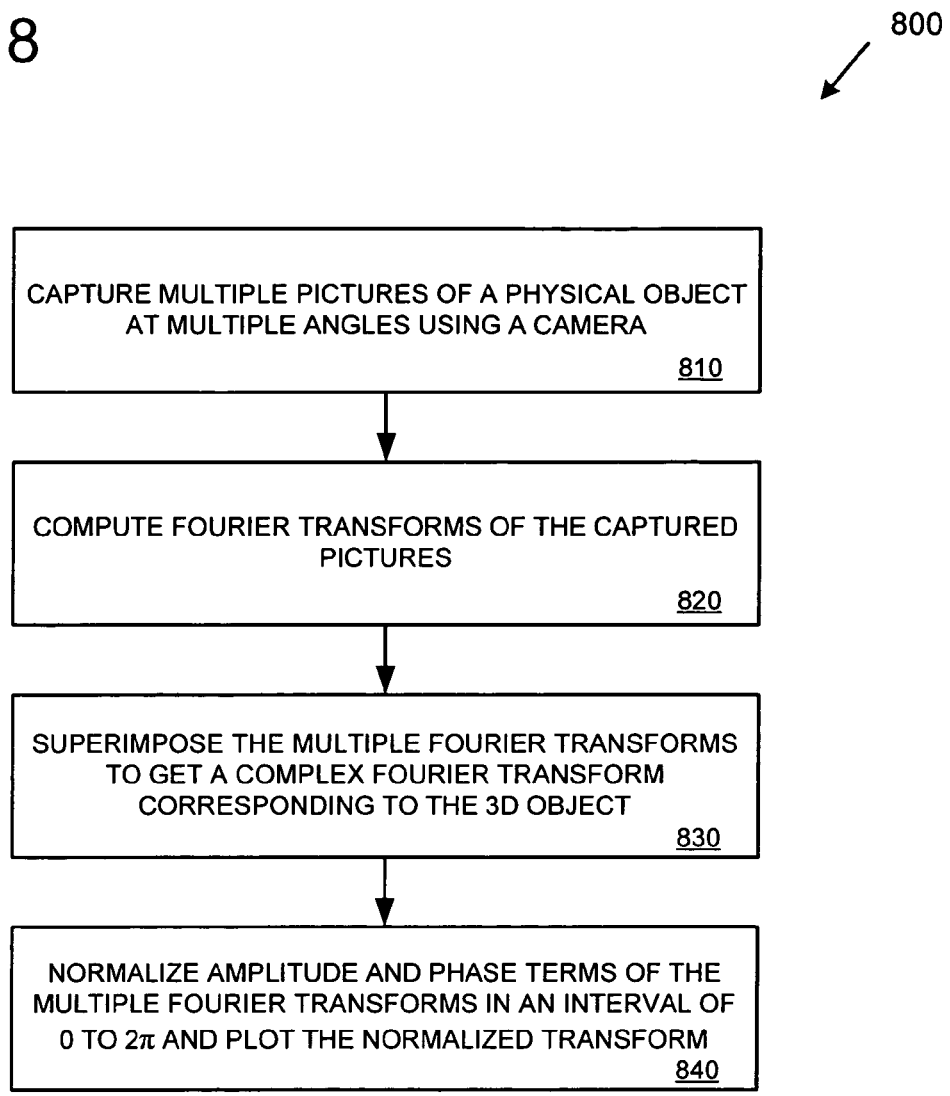
FIG. 8 is a flowchart illustrating an exemplary method for creating a computer generated hologram of a physical object.

FIG. 8 is a flow chart illustrating an exemplary method 800 for creating a computer generated hologram of a physical object, and can be performed, for example, by a system such as that shown in FIG. 1. The method starts at 810 by capturing multiple pictures of a physical object at multiple angles using a camera (e.g., a digital camera). The details of capturing the pictures using the camera are explained in the earlier sections. The method 800 continues at step 820, where multiple Fourier transforms are computed for the captured pictures. In other words, each picture is represented as an individual Fourier transform. At 830, the individual Fourier transforms are superimposed to form a complex Fourier transform.

In one aspect, the method 800 continues at 840, where the amplitude and phase terms of the multiple Fourier transforms may be normalized in an interval of 0 to $2\pi$ and the corresponding result is plotted.

The computer generated hologram can be produced from the complex Fourier transform. The computer generated hologram represents the three dimensional physical object and can be used to display a holographic representation of the physical object using, for example, a system such as that shown in FIG. 1. Once the computer generated hologram has been created, it may be transmitted between multiple devices.

In one implementation, the method 800 can include converting animation to multiple frames and computing the multiple Fourier transforms of the multiple frames. Animation is just a set of continuous images (frames) displayed in quick succession, so that motion effects are created due to persistence of vision.

In another implementation, the method 800 can include creating a computer generated hologram of a physical object from a plurality of two dimensional pictures corresponding to a plurality of two dimensional Fourier transforms and superimposing the plurality of two dimensional Fourier transforms to obtain a single complex three dimensional Fourier transform. In other words, the computer generated hologram of the physical object may be created by capturing a plurality of two dimensional pictures captured at different angles using a camera module (e.g., a camera module of a device).

It should be noted that the above implementations may be adopted in existing devices with very minimal changes in the devices. This is made possible because the data volume of digital holograms (e.g., computer generated holograms) is much less than the information obtained when it is re-created, which makes it possible to send them over communication networks with limited bandwidth (e.g., over wireless communication networks).

In one implementation, the device may be adapted to only create a computer generated hologram of an object. In another implementation, the device may be adapted to only send or receive a computer generated hologram. In yet another implementation, the device may be adapted to only display a computer generated hologram. The device may also be adapted to perform combinations of the above (e.g., create and display computer generated holograms, or create and transmit computer generated holograms).

Figure 9:
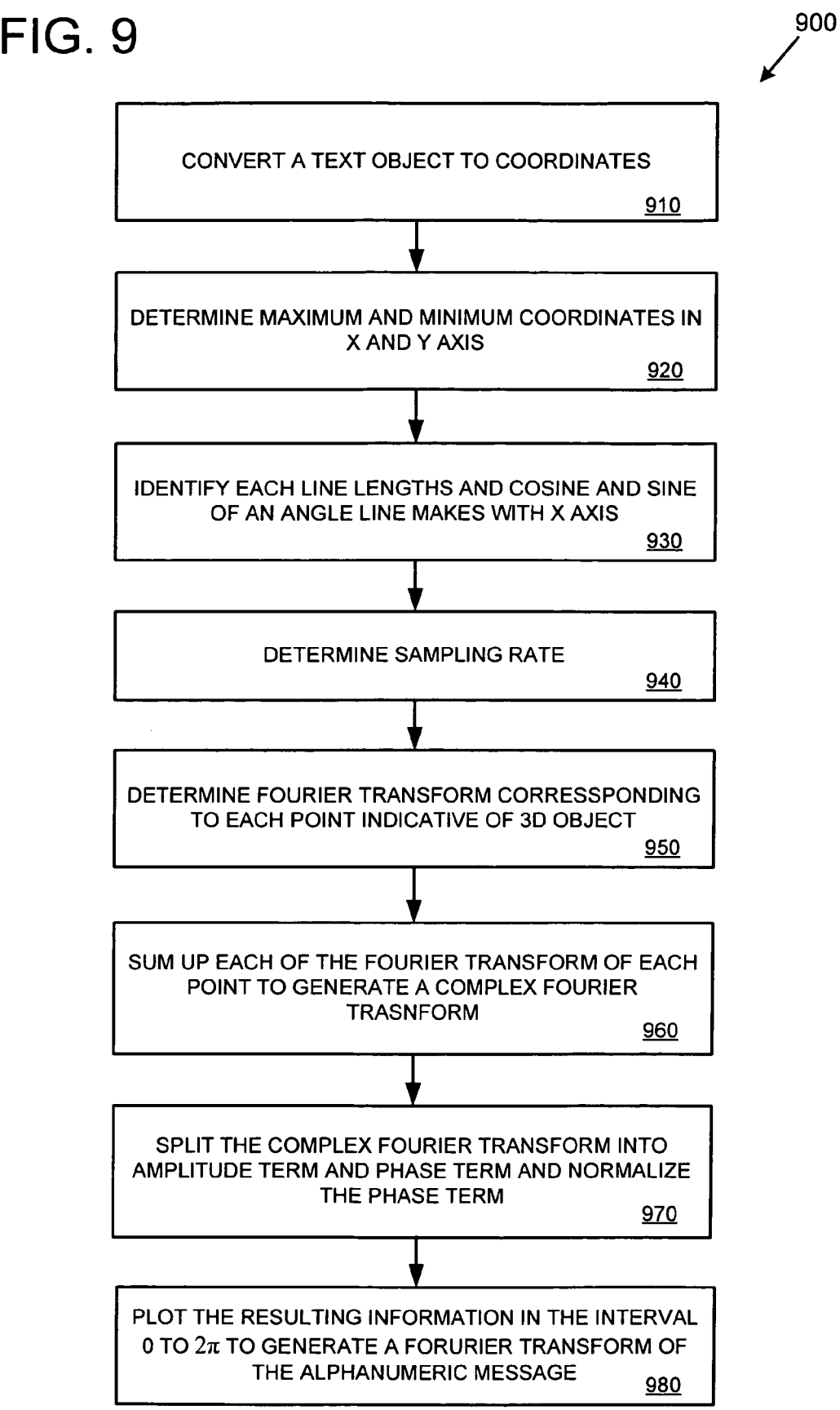
FIG. 9 is a flowchart illustrating an exemplary method for creating a computer generated hologram of a text object.

FIG. 9 is a flow chart illustrating an exemplary method 900 for creating a computer generated hologram of a text object, and can be performed, for example, by a system such as that shown in FIG. 1. The method described in FIG. 9 can be used, for example, to convert a text object (e.g., a text message) to a compressed three dimensional image of the text object using fringe patterns.

At 910, a text object (e.g., a text message) is converted to coordinates. For example, the text object can be received from an outside device (e.g., from a cell phone via a wireless communication network). The text object can also be directly entered at a device performing the method 900 (e.g., entered by a user via a keypad of the device).

At 920 the maximum and minimum coordinates in X and Y axes are identified. At 930 the length of each line, as well as the Cosine and Sin of the angle the line makes with the X axis, is determined. At 940, the sampling rate is calculated as follows:

$$2*\pi/(Xmax-Xmin) \text{ or}$$

$$2*\pi/(Ymax-Ymin)$$

which ever is greater.

At 950, the Fourier transform corresponding to each point indicative of the object is calculated. At 960, the Fourier transform is summed up at each sampling point to generate a complex Fourier transform. At 970, the complex Fourier transform is split into an amplitude term and a phase term. The phase term is then be normalized over the interval 0 to $2\pi$ as explained in earlier sections above. Finally, at 980, the resulting information of the previous step may be plotted in the interval 0 to $2\pi$. The result may be referred as the computer generated hologram of the 3D object.

The above implementation as described in FIG. 9 is based on the theory that any letter or object constructed from N straight lines has a Fourier transform as indicated below:

$$F(x, y) = \sum_{i=1}^{N} F_i(x, y)$$

In a computer generated hologram, the function F(x,y) may be calculated at a number of points depending on the image clarity required and the availability and capability of the system computing the transform. Though the straight line objects are only 2D objects, when one looks at the displayed hologram, one will see a depth effect because the background is projected behind the surface of the image giving parallax between foreground and background. Thus computer generated holograms may be created from text objects by a device using the above method. When a text object (e.g., a text message) is sent between multiple devices which do not support 3D, the above algorithm can still be used to compute a computer generated hologram from the text object and display a holographic three dimensional image representing the text object.

In another embodiment, a physical object shot using a camera may be converted to a complex Fourier transform. For this, a camera (e.g., a digital camera with high shutter speed) takes pictures at slightly different angles. The system computes 2D transforms of each of the pictures. These 2D transforms are superimposed to get a complex 3D transform or fringe pattern. The complex fringe pattern on illumination will display a holographic three dimensional image of the physical object 3D object. The number of pictures shot directly corresponds to the depth and clarity of the displayed hologram as a more approximate Fourier transform is obtained. Calculation of such Fourier transforms may require systems with good computing capabilities. The Fourier transform suggested is the product of a set of 2D transforms computed from the pictures shot.

In yet another embodiment, in order to transfer and display animations at a device (e.g., a wireless device), the computer generated hologram created from the Fourier transforms corresponding to each frame needs to be sent. The computer generated hologram may be easily displayed on a spatial light modulator (described earlier) with good frame rate. Frame rate is the number of frames that may be displayed in the SLM per second. The more frames that may be drawn, the greater the ability to show the effects of animation due to persistence of vision.

Figure 10:
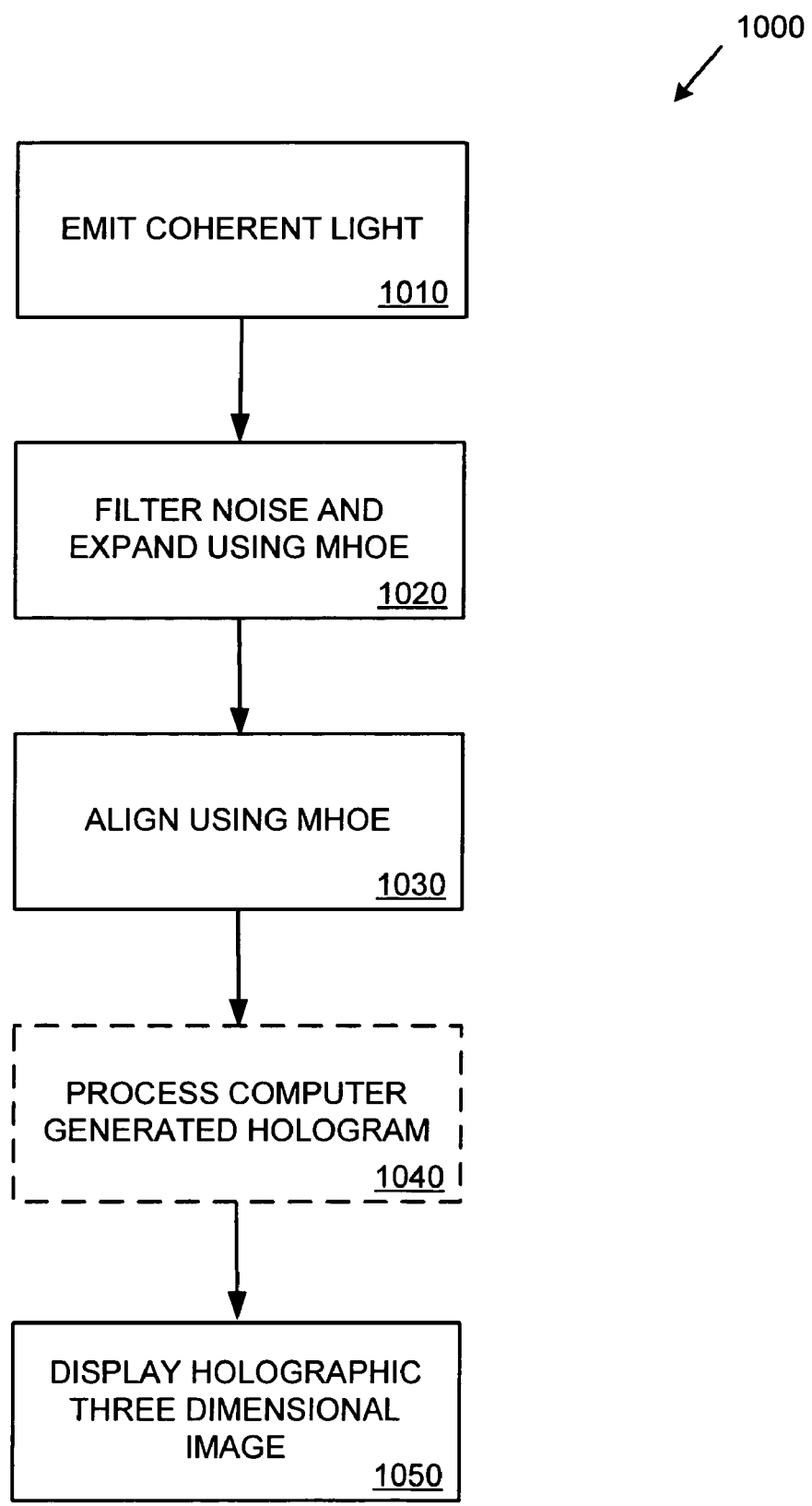
FIG. 10 is a flowchart showing an exemplary method for displaying a holographic three dimensional image of an object.

FIG. 10 shows an exemplary method 1000 for displaying a holographic three dimensional image of an object (e.g., a physical object or a text object) via a device (e.g., a computing device) comprising micro holographic optical elements, and can be performed, for example, by a system such as that shown in FIG. 1. At 1010, a coherent light is emitted (e.g., via a laser source). At 1020, noise is filtered from the coherent light and an expanded light is generated using at least one micro holographic optical element lens. For example, 1020 can be implemented via a spatial filter. At 1030, the expanded light is aligned using at least one micro holographic optical element lens (e.g., via a collimating micro holographic optical element lens).

Optionally, at 1040, a computer generated hologram (representing the three dimensional image of the object) is processed. For example, the computer generated hologram can be received by the device via a communication network (e.g., via a wireless communication network). The computer generated hologram can also be created by the device (e.g., created by capturing pictures of a physical object or by entry of a text message). A result of the processing can be provided to a SLM.

At 1050, the holographic three dimensional image of the object is displayed. For example, a SLM can modulate the aligned expanded light (e.g., according to a result from processing of a computer generated hologram). In addition, the modulated light can be focused using cylindrical micro holographic optical element lenses (e.g., a horizontal and a vertical cylindrical micro holographic optical element lens).

Figure 11:
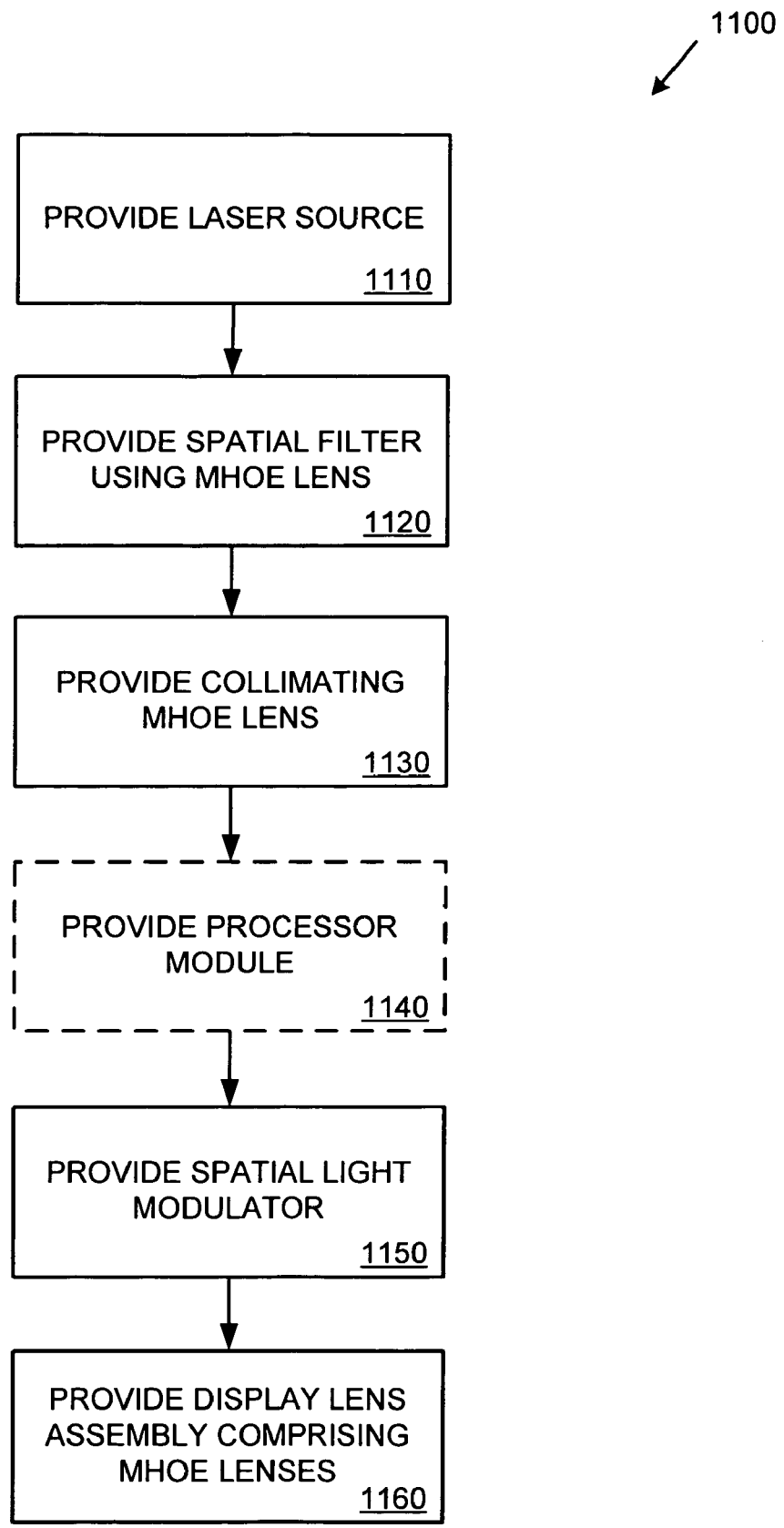
FIG. 11 is a flowchart showing an exemplary method for providing a device, comprising micro holographic optical elements, for displaying a holographic three dimensional image of an object.

FIG. 11 shows an exemplary method 1100 for providing a device (e.g., a computing device), comprising micro holographic optical elements, for displaying a holographic three dimensional image of an object (e.g., a physical object or a text object), and can be performed, for example, by a system such as that shown in FIG. 1. At 1110, a laser source is provided (e.g., for emitting a coherent light). At 1120, a spatial filter, using at least one MHOE, is provided (e.g., for filtering and expanding the coherent light). At 1130, a collimating MHOE lens is provided (e.g., for aligning the expanded light).

Optionally, at 1140, a processor module is provided for processing a computer generated hologram and providing a result to a SLM. For example, the computer generated hologram can be received by the device via a communication network (e.g., via a wireless communication network). The computer generated hologram can also be created by the device (e.g., created by capturing pictures of a physical object or by entry of a text message).

At 1150, a SLM is provided for modulating the aligned expanded light (e.g., according to a result from processing a computer generated hologram). At 1160, a display lens assembly is provided for displaying the holographic three dimensional image of the object by focusing the modulated light. For example, the display lens assembly can comprise cylindrical micro holographic optical element lenses (e.g., a horizontal and a vertical cylindrical micro holographic optical element lens).

FIG. 12 is a perspective view of an exemplary device 1200 configured to display a holographic three dimensional image of an object. For example, the device 1200 can be a wireless device, such as a cell phone (e.g., a wireless device in a wireless communication network). As illustrated, the device 1200 includes a laser source 110 configured to emit a coherent light. A spatial filter 120 is used to filter the coherent light and generate an expanded light using at least one micro holographic optical element lens. A collimating micro holographic optical element lens 130 aligns the expanded light. Depending on the physical layout of the device 1200, and the desired location for displaying the holographic image, the aligned light can be redirected (e.g., in an arbitrary direction) using one or more mirrors. For example, the device 1200 uses a mirror 1210 at a 45 degree angle to redirect the aligned light by 90 degrees. Alternatively, mirrors can be used at different locations to redirect the light (e.g., due to physical layout requirements). For example, a mirror can be used between the laser source 110 and the spatial filter 120.

A spatial light modulator 140 modulates the aligned light. For example, the spatial light modulator (SLM) 140 can modulate the aligned light based on a computer generated hologram (e.g., a result of processing the computer generated hologram), where the computer generated hologram represents the three dimensional image of the object (e.g., as a fringe pattern). The device 1200 can also comprise a processor module, such as processor module 160, that can process a computer generated hologram and provide a result to the SLM 140. The SLM 140 illustrated in the device 1200 is a transmission type SLM. Instead of a transmission type SLM, other types of SLMs can be used (e.g., a reflective type SLM).

A display lens assembly 150 is used to focus and clarify the modulated light from the SLM 140. The display lens assembly 150 comprises a horizontal cylindrical micro holographic element lens and a vertical cylindrical micro holographic element lens. The focused modulated light displays the holographic three dimensional image of the object 1220.

In one implementation, in order to transfer and display simple animations using the device 1200, the Fourier transform information corresponding to each frame needs to be sent. This information may be easily displayed on a spatial light modulator (e.g., SLM 140) with good frame rate. Since most of the spatial light modulators available nowadays have frame rate more than 50 hertz (Hz), persistence of vision can result in the perception of an animated holographic image.

As will be appreciated by those ordinary skilled in the art, the foregoing examples, demonstrations, and method steps may be implemented by suitable code on a processor base system, such as general purpose or special purpose computer. It should also be noted that different implementations of the various technologies described herein may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The sequence of instructions as explained in the method steps may include, but are not limited to, program code adapted for emitting a coherent light via a laser source and program code adapted for filtering noise from the coherent light and generate an expanded light using a spatial filter, where the spatial filter uses at least one micro holographic optical element lens. The sequence of instructions may also include program code adapted for aligning the expanded light using a collimating micro holographic optical element lens. Furthermore, the sequence of instructions may include program code adapted for obtaining and processing a computer generated hologram using a processor module and displaying a holographic three dimensional image of an object via a spatial light modulator and a display lens assembly comprising cylindrical micro holographic optical element lenses.

In one embodiment, the sequence of instructions may include program code adapted for creating a computer generated hologram of an object from a plurality of two dimensional images corresponding to a plurality of two dimensional Fourier transforms and superimposing the plurality of two dimensional Fourier transforms to create a single complex Fourier transform.

In another embodiment, the sequence of instructions may include program code adapted for creating a computer generated hologram of an object indicative of a plurality of two dimensional pictures captured at different angles using a camera.

In yet another embodiment, the sequence of instructions may include program code adapted for converting a plurality of Fourier transforms into a single complex Fourier transform for sending, receiving, and displaying a computer generated hologram of an object.

In yet another embodiment, a device configured to display a holographic three dimensional image of an object in a communication network is disclosed. The device comprises a laser source configurable to emit a coherent source of light and at least one spatial filter adapted to filter out noise from the coherent source of light and generate an expanded light using at least one micro holographic optical element lens. The device further includes a collimating micro holographic optical element lens adapted to align the expanded light and a spatial light modulator configurable to modulate the aligned expanded light and display a plurality of three-dimensional information of the object using the aligned expanded light. It should be noted that the plurality of three dimensional information of the object are integrated to display the holographic three dimensional image of the object. Optionally, cylindrical micro holographic optical element lenses can be used to focus and/or clarify the holographic three dimensional image of the object.

In yet another embodiment, a method for displaying a holographic three dimensional image of an object using a device in a communication network is disclosed. The method includes emitting a coherent source of light via a laser source and filtering noise from the coherent source of light using at least one filter (e.g., a spatial filter comprising at least one micro holographic optical element lens). The method further includes filtering noise from the coherent source of light and generating an expanded light using at least one micro holographic optical element lens. The method further includes aligning the expanded light using a collimating micro holographic optical element lens. Furthermore, the method includes displaying a plurality of three-dimensional information of the object via a spatial light modulator and creating a plurality of Fourier transforms corresponding to the plurality of three dimensional information of the object on the spatial light modulator. The method also includes displaying the holographic three dimensional image of the object by illuminating the spatial light modulator on which a complex Fourier transform is created. Optionally, the method further includes focusing and/or clarifying the displayed holographic three dimensional image using cylindrical micro holographic optical element lenses.

As will be appreciated by a person skilled in the art, the various technologies described herein provide a variety of advantages. For example, the various technologies allow communication of holographic three dimensional images using existing bandwidth (e.g., holographic 3D images can be sent, received, and displayed using existing communication networks). In addition, the described techniques result in more reliable systems (e.g., devices) due to the use of micro holographic optical elements (MHOEs) (e.g., the systems can be made lighter, less expensive, and less susceptible to shock, vibration, and the like). For example, MHOEs can be produced inexpensively. Furthermore, a device can require only one SLM.

Figure 13:
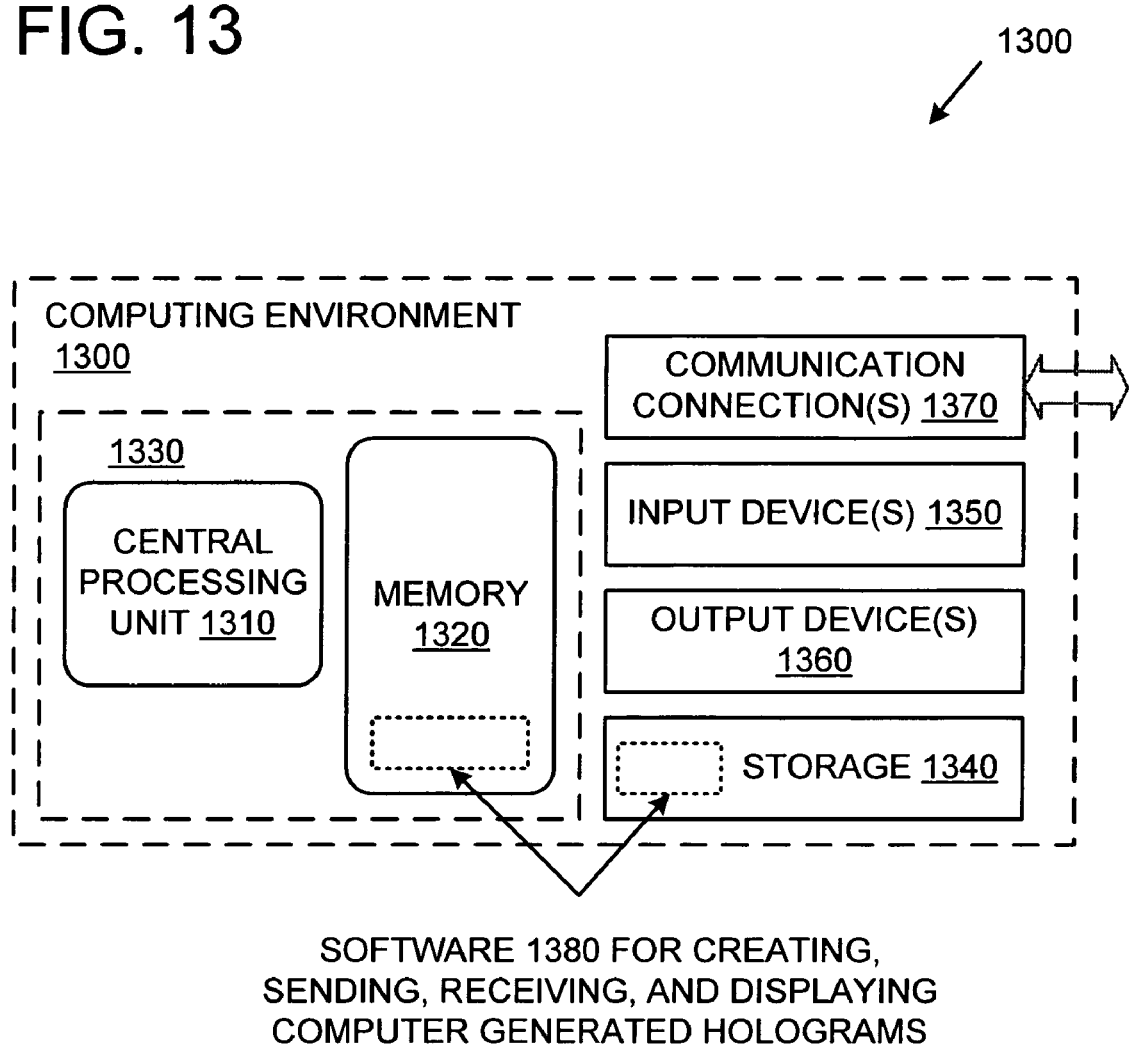
FIG. 13 is a block diagram illustrating an example of a computing environment that can be used to implement any of the technologies described herein.

FIG. 13 illustrates a generalized example of a suitable computing environment 1300 in which described embodiments and techniques may be implemented. The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one central processing unit 1310 and memory 1320. In FIG. 13, this most basic configuration 1330 is included within a dashed line. The central processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380 implementing the described methods for creating, sending, receiving, and displaying computer generated holograms. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and which can be accessed within the computing environment 1300. The storage 1340 stores instructions for the software 1380 implementing methods for creating, sending, receiving, and displaying computer generated holograms.

The input device(s) 1350 may be a touch input device, such as a keyboard, keypad, mouse, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1300. By way of example, and not limitation, with the computing environment 1300, computer-readable media include memory 1320, storage 1340, communication media (not shown), and combinations of any of the above.

Any of the methods described herein can be performed via one or more computer-readable media having computer-executable instructions for performing such methods. Operation can be fully automatic, semi-automatic, or involve manual intervention.

It will also be appreciated that the actions may be varied or rearranged in a number of ways consistent with the systems and methods described herein. The technologies of any example described herein can be combined with the technologies of any one or more other examples described herein. More generally, while the invention has been disclosed in connection with certain preferred embodiments, other embodiments will be recognized by those of ordinary skill in the art, and all such variations, modifications, and substitutions are intended to fall within the scope of this disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A device for displaying a holographic three dimensional image of an object, the device comprising:
    a laser source configured to emit a coherent light;
    a spatial filter adapted to filter out noise from the coherent light and generate an expanded light using at least one micro holographic optical element lens;
    a collimating micro holographic optical element lens adapted to align the expanded light;
    a spatial light modulator configured to modulate the aligned expanded light; and
    a display lens assembly comprising a horizontal cylindrical micro holographic optical element lens and a vertical cylindrical micro holographic optical element lens for focusing the modulated light from the spatial light modulator.

2. The device of claim 1 wherein the spatial light modulator is configured to modulate the aligned expanded light according to a digital representation of the holographic three dimensional image of the object.

3. The device of claim 1 further comprising:
    a processor module for obtaining and processing a computer generated hologram and providing a result of the processing to the spatial light modulator, wherein the computer generated hologram represents the holographic three dimensional image of the object;
    wherein the spatial light modulator is configured to receive the result of the processing of the computer generated hologram and modulate the aligned expanded light according to the result of the processing of the computer generated hologram.

4. The device of claim 1 wherein the object is a text object.

5. The device of claim 1 wherein the object is a physical object.

6. The device of claim 5 further comprising:
    a camera module adapted to capture a plurality of pictures of the physical object taken at different angles; and a processor module, wherein the processor module creates a computer generated hologram representing the holographic three dimensional image of the physical object by converting the captured plurality of pictures into a plurality of Fourier transforms and converting the plurality of Fourier transforms into a single complex Fourier transform.

7. The device of claim 1 wherein the holographic three dimensional image of the object is represented by a computer generated hologram, wherein the computer generated hologram has been created using one or more Fourier transforms, and wherein the spatial light modulator is modulated according to the computer generated hologram.

8. The device of claim 7 wherein the computer generated hologram is received by the device via a communication network.

9. The device of claim 7 wherein the computer generated hologram is created by the device and sent to a different device via a communication network.

10. The device of claim 1 wherein the device is a communication device in a communication network.

11. The device of claim 1 wherein the device is a wireless device in a wireless communication network.

12. A method for displaying a holographic three dimensional image of an object via a device comprising micro holographic optical elements, the method comprising:
emitting a coherent light;
filtering noise from the coherent light and generating an expanded light using at least one micro holographic optical element lens;
aligning the expanded light using at least one micro holographic optical element lens; and
displaying the holographic three dimensional image of the object by modulating the aligned expanded light and focusing the modulated aligned expanded light using at least one horizontal cylindrical micro holographic optical element lens and at least one vertical cylindrical micro holographic optical element lens.

13. The method of claim 12 further comprising:
processing a computer generated hologram and providing a result of the processing to a spatial light modulator, wherein the computer generated hologram represents the holographic three dimensional image of the object, and wherein the aligned expanded light is modulated by the spatial light modulator according to the result of the processing of the computer generated hologram.

14. The method of claim 12 wherein the aligned expanded light is modulated according to a digital representation of the holographic three dimensional image of the object.

15. The method of claim 12 wherein the device is a communication device in a communication network.

16. The method of claim 12 wherein the object is a physical object, and wherein the method further comprises:
capturing a plurality of pictures of the physical object taken at different angles; and
creating a computer generated hologram by converting the captured plurality of pictures into a plurality of Fourier transforms and converting the plurality of Fourier transforms into a single complex Fourier transform;
wherein the aligned expanded light is modulated according to the computer generated hologram.

17. The method of claim 12 further comprising:
receiving, by the device via a communication network, a computer generated hologram representing the holographic three dimensional image of the object;
wherein the aligned expanded light is modulated according to the received computer generated hologram.

18. A method for providing a device, comprising micro holographic optical elements, for displaying a holographic three dimensional image of an object, the method comprising:
providing a laser source for emitting a coherent light;
providing a spatial filter for filtering noise from the coherent light and generating an expanded light using at least one micro holographic optical element lens;
providing a collimating micro holographic optical element lens for aligning the expanded light;
providing a spatial light modulator configured to modulate the aligned expanded light; and
providing a display lens assembly comprising a horizontal cylindrical micro holographic optical element lens and a vertical cylindrical micro holographic optical element lens for focusing the modulated light from the spatial light modulator.

19. The device of claim 18 further comprising:
providing a processor module for processing a computer generated hologram and providing a result of the processing to the spatial light modulator, wherein the computer generated hologram represents the holographic three dimensional image of the object;
wherein the spatial light modulator is configured to receive the result of the processing of the computer generated hologram and modulate the aligned expanded light according to the result of the processing of the computer generated hologram.

20. The computing device of claim 18 wherein the object is a physical object, and wherein the method further comprises:
providing a camera module adapted to capture a plurality of pictures of the physical object taken at different angles; and
providing a processor module, wherein the processor module creates a computer generated hologram by converting the captured plurality of pictures into a plurality of Fourier transforms and converting the plurality of Fourier transforms into a single complex Fourier transform;
wherein the spatial light modulator is configured to modulate the aligned expanded light according to the computer generated hologram.

* * * * *